US011323900B2

(12) United States Patent
Salahuddeen et al.

(10) Patent No.: US 11,323,900 B2
(45) Date of Patent: May 3, 2022

(54) RADIO ENVIRONMENT MONITORING IN A BASE STATION USING A MOBILE CHIP

(71) Applicant: CommScope Technologies LLC, Hickory, NC (US)

(72) Inventors: Irfaan Ahamed Salahuddeen, Acton, MA (US); Nandish Chalishazar, Nashua, NH (US)

(73) Assignee: CommScope Technologies LLC, Hickory, NC (US)

( * ) Notice: Subject to any disclaimer, the term of this patent is extended or adjusted under 35 U.S.C. 154(b) by 129 days.

(21) Appl. No.: 16/823,181

(22) Filed: Mar. 18, 2020

(65) Prior Publication Data
US 2020/0329390 A1   Oct. 15, 2020

Related U.S. Application Data

(60) Provisional application No. 62/831,603, filed on Apr. 9, 2019.

(51) Int. Cl.
*H04W 24/08* (2009.01)
*H04W 72/04* (2009.01)
*H04W 74/08* (2009.01)
*H04B 17/318* (2015.01)

(52) U.S. Cl.
CPC .......... *H04W 24/08* (2013.01); *H04B 17/318* (2015.01); *H04W 72/0453* (2013.01); *H04W 74/0833* (2013.01)

(58) Field of Classification Search
CPC ............. H04W 72/0453; H04W 24/08; H04W 74/0833; H04W 24/02; H04B 17/318; H04B 17/24
See application file for complete search history.

(56) References Cited

U.S. PATENT DOCUMENTS

| 2002/0187749 A1 | 12/2002 | Beasley et al. |
| 2012/0140642 A1 | 6/2012 | Beck et al. |
| 2014/0323119 A1 | 10/2014 | Bader |

(Continued)

FOREIGN PATENT DOCUMENTS

KR   20130119000 A   10/2013

OTHER PUBLICATIONS

International Searching Authority, "International Search Report and Written Opinion from PCT Application No. PCT/US2020/023431", from Foreign Counterpart to U.S. Appl. No. 16/823,181, filed Jul. 17, 2020, pp. 1 through 13, Published: WO.

(Continued)

*Primary Examiner* — Brian D Nguyen
(74) *Attorney, Agent, or Firm* — Fogg & Powers LLC (57) ABSTRACT

A base station for performing radio environment monitoring (REM) is described. The base station includes a REM module. The REM module includes user equipment (UE) circuitry communicatively coupled to a baseband processor and a dedicated antenna. The REM module also includes the baseband processor. The baseband processor is configured to send at least one instruction to the mobile circuitry to determine a plurality of REM parameters for a frequency band (or channel, e.g., EARFCN). The mobile circuitry is configured to determine the plurality of REM parameters for the frequency band (or channel) in response to receiving the at least one instruction.

34 Claims, 7 Drawing Sheets

(56) References Cited

U.S. PATENT DOCUMENTS

| | | | |
|---|---|---|---|
| 2017/0295497 A1 | 10/2017 | Macmullan et al. | |
| 2017/0336292 A1* | 11/2017 | Gautier | G01M 17/10 |
| 2018/0192338 A1* | 7/2018 | Axmon | H04L 5/0055 |
| 2018/0324742 A1* | 11/2018 | Agarwal | H04L 27/2607 |
| 2019/0069219 A1* | 2/2019 | Stjernholm | H04W 48/02 |
| 2019/0090233 A1* | 3/2019 | Fong | H04W 72/0453 |
| 2019/0200270 A1* | 6/2019 | Yu | H04W 36/30 |
| 2019/0306909 A1* | 10/2019 | Zhou | H04W 72/02 |
| 2020/0228997 A1* | 7/2020 | Chen | H04W 16/14 |
| 2020/0245254 A1* | 7/2020 | Nama | H04W 24/02 |
| 2021/0014015 A1* | 1/2021 | Suzuki | H04B 1/7143 |
| 2021/0103045 A1* | 4/2021 | Kravets | G01S 7/41 |
| 2021/0126692 A1* | 4/2021 | Chung | H04B 7/0452 |
| 2021/0289440 A1* | 9/2021 | Mochizuki | H04W 16/32 |

OTHER PUBLICATIONS

Kim et al., "Exploiting the Capture Effect to Enhance RACH Performance in Cellular-Based M2M Communications", Sensors 17, 2169, Sep. 21, 2017, pp. 1 through 22, MDPI, www.mdpi.com/journal/sensors.

* cited by examiner

RADIO ENVIRONMENT MONITORING IN A BASE STATION USING A MOBILE CHIP

CROSS-REFERENCE TO RELATED APPLICATIONS

This application claims priority to U.S. Provisional Patent Application No. 62/831,603 entitled "RADIO ENVIRONMENT MONITORING IN A BASE STATION USING A MOBILE CHIP" filed on Apr. 9, 2019, which is incorporated by reference in its entirety.

BACKGROUND

Radio environment monitoring (REM) may be used to monitor an RF environment at a particular physical location. REM may be useful to make certain network configuration decisions and optimizations. Accordingly, it may be beneficial to implement REM in a base station.

SUMMARY

A base station for performing radio environment monitoring (REM) is described. The base station includes a REM module. The REM module includes user equipment (UE) circuitry communicatively coupled to a baseband processor and a dedicated antenna. The REM module also includes the baseband processor. The baseband processor is configured to send at least one instruction to the mobile circuitry to determine a plurality of REM parameters for a frequency band (or channel, e.g., EARFCN). The mobile circuitry is configured to determine the plurality of REM parameters for the frequency band (or channel) in response to receiving the at least one instruction.

DRAWINGS

Understanding that the drawings depict only exemplary configurations and are not therefore to be considered limiting in scope, the exemplary configurations will be described with additional specificity and detail through the use of the accompanying drawings, in which.

In accordance with common practice, the various described features are not drawn to scale but are drawn to emphasize specific features relevant to the exemplary configurations.

DETAILED DESCRIPTION

Radio environment monitoring (REM) is a process during which radio frequency (RF) signals are observed at a fixed physical location. For example, a base station may listen to (e.g., like a mobile device) and collect information about surrounding base stations in the same locality. In other words, during REM, a particular base station measures and/or extracts parameters from RF signals transmitted from other base stations (and/or other types of devices) that the particular base station does not control. The collected information may include various signal metrics and/or other parameters (referred to as "REM parameters" herein) relating to the neighboring transmitting devices. In some configurations, the REM parameters may be used by a self-organizing network (SON) module to configure aspects of the network.

Figure 1:
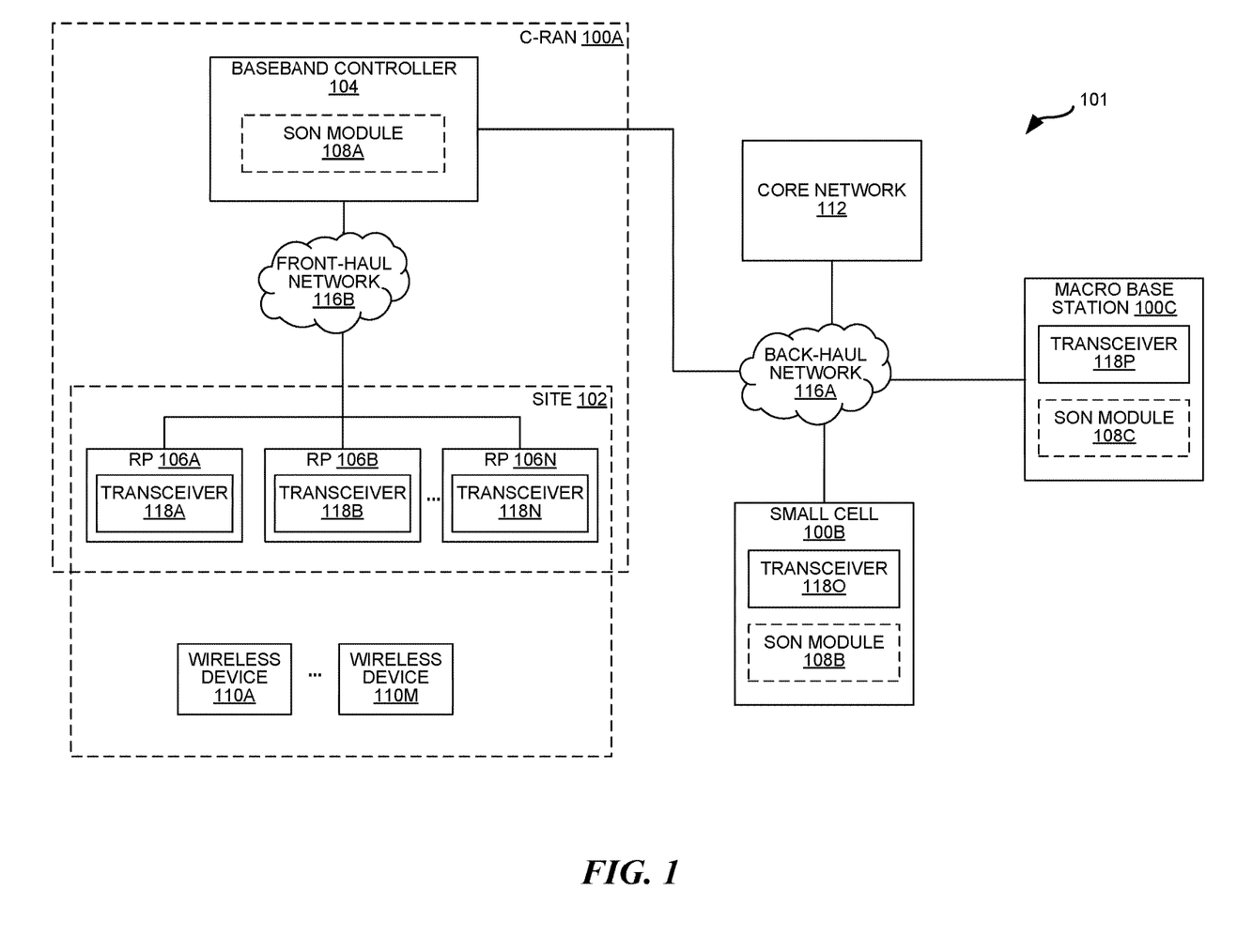
FIG. 1 is a block diagram illustrating an exemplary configuration of a system implementing radio environment monitoring (REM) in a base station.

FIG. 1 is a block diagram illustrating an exemplary configuration of a system 101 implementing radio environment monitoring (REM) in a base station 100A-C. The term base station 100 herein refers to any electronic device configured to receive and transmit RF signals in order to provide wireless service to user equipment (UEs) 110A-M. Typically, base stations 100 are in a fixed location, however other configurations are possible. Without limitation, types of base stations include a cloud radio access network (C-RAN) 100A, a small cell 100B, a macro base station 100C, etc. Small cells 100B are generally lower-power, shorter-range, and can serve fewer max concurrent users than macro base stations 100C. For example, small cell(s) 100B may be used to fill in coverage gaps in macro base station 100C coverage, e.g., indoors, in urban environments, etc.

Each base station 100 may include at least one transceiver 118A-P configured to receive and/or transmit RF signals. As discussed below, each transceiver 118 may include circuitry configured to perform REM.

In the exemplary configuration shown in FIG. 1, the C-RAN 100A may utilize a point-to-multipoint distributed base station architecture that employs at least one (and optionally multiple) baseband unit 104 and multiple radio points (RPs) 106A-N that serve at least one cell. The C-RAN 100A may also be referred to herein as a "C-RAN system," an "eNodeB," and/or a "base station." The baseband unit 104 is also referred to herein as a "baseband controller" 104, just a "controller" 104, or "CU" 104. Each RP 106 may include or be coupled to at least one antennas via which downlink RF signals are radiated to UEs 110A-M and via which uplink RF signals transmitted by UEs 110 are received. Furthermore, where an action is described as being performed by a C-RAN 100A, it may be performed in the baseband controller 104 and/or at least one RP 106. In a C-RAN 100A implementation, each RP 106 may include a transceiver 118.

The RPs 106 and UEs 110 connected to (e.g., provided wireless service by) the C-RAN 100A may be located at a site 102. The site 102 may be, for example, a building or campus or other grouping of buildings (used, for example, by one or more businesses, governments, other enterprise entities) or some other public venue (such as a hotel, resort, amusement park, hospital, shopping center, airport, university campus, arena, or an outdoor area such as a ski area, stadium or a densely-populated downtown area). For example, the site 102 may be at least partially indoors, but other alternatives are possible.

It should be noted that the baseband controller 104 may or may not be located at the site 102 (with the RPs 106). For example, the baseband controller 104 may be physically located remotely from the RPs 106 (and the site 102) in a centralized bank of baseband controllers 104. Additionally, the RPs 106 are preferably physically separated from each other within the site 102, although they are each communicatively coupled to the baseband controller 104.

Each UE 110 may be a computing device with at least one processor that executes instructions stored in memory, e.g., a mobile phone, tablet computer, mobile media device, mobile gaming device, laptop computer, vehicle-based computer, a desktop computer, etc. It should be noted that any number of UEs 110 (e.g., M=1-1,000) may be present at the site 102.

The C-RAN 100A may be coupled to the core network 112 of each wireless network operator over an appropriate back-haul network 116A. For example, the Internet (or any other ETHERNET network) may be used for back-haul between the system 101 and each core network 112. However, it is to be understood that the back-haul network 116A can be implemented in other ways.

In some configurations, the system 101 may be implemented as a Long Term Evolution (LTE) radio access network providing wireless service using an LTE air interface. However, it should be noted that the present systems and methods may be used with other wireless protocols, e.g., 2G, 3G, 4G, 5G. LTE is a 4G standard defined by 3GPP standards organization. In the LTE configuration, the baseband controller 104 and RPs 106 together (C-RAN 100A) may be used to implement an LTE Evolved Node B (also referred to here as an "eNodeB" or "eNB"). An eNodeB may be used to provide UEs 110 with mobile access to the wireless network operator's core network 112 to enable UE 110 to wirelessly communicate data and voice (using, for example, Voice over LTE (VoLTE) technology).

Also, in an exemplary LTE configuration, each core network 112 may be implemented as an Evolved Packet Core (EPC) 112 comprising standard LTE EPC network elements such as, for example, a mobility management entity (MME) and a Serving Gateway (SGW) and, optionally, a Home eNodeB gateway (HeNodeB GW) (not shown) and a Security Gateway (SeGW) (not shown).

Moreover, in an exemplary LTE configuration, the baseband controller 104 may communicate with the MME and SGW in the EPC core network 112 using the LTE S1 interface and communicates with eNodeBs using the LTE X2 interface. For example, the baseband controller 104 can communicate with an outdoor macro eNodeB (not shown) via the LTE X2 interface.

The baseband controller 104 and radio points 106 can be implemented so as to use an air interface that supports one or more of frequency-division duplexing (FDD) and/or time-division duplexing (TDD). Also, the baseband controller 104 and the radio points 106 can be implemented to use an air interface that supports one or more of the multiple-input-multiple-output (MIMO), single-input-single-output (SISO), and/or beam forming schemes. For example, the baseband controller 104 and the radio points 106 can implement one or more of the LTE transmission modes. Moreover, the baseband controller 104 and the radio points 106 can be configured to support multiple air interfaces and/or to support multiple wireless operators.

In some configurations, the front-haul network 116B that communicatively couples each baseband controller 104 to the one or more RPs 106 is implemented using a standard ETHERNET network. However, it is to be understood that the front-haul network 116B between the baseband controller 104 and RPs 106 can be implemented in other ways. The front-haul network 116B may be implemented with one or more switches, routers, and/or other networking devices.

Data can be front-hauled between the baseband controller 104 and RPs 106 in any suitable way (for example, using front-haul interfaces and techniques specified in the Common Public Radio Interface (CPRI) and/or Open Base Station Architecture Initiative (OBSAI) family of specifications).

Although not shown, a management system may be communicatively coupled to the baseband controller 104 and RPs 106, for example, via the back-haul network 116A and the front-haul network 116B (in the case of the RPs 106). The management system may send and receive management communications to and from the baseband controller 104, which in turn forwards relevant management communications to and from the RPs 106.

The Third Generation Partnership Project (3GPP) has adopted a layered model for the LTE radio access interface. Generally, the baseband controller 104 and/or RPs 106 perform analog radio frequency (RF) functions for the air interface as well as digital Layer-1 (L1), Layer-2 (L2), and/or Layer-3 (L3), of the 3GPP-defined LTE radio access interface protocol, functions for the air interface. In some configurations, the Layer-1 processing for the air interface may be split between the baseband controller 104 and the RPs 106, e.g., with L2-L3 functions for the air interface being performed at the baseband controller 104.

The at least one transceiver 118 in each base station 100 may listen to surrounding RF signals as part of radio environment monitoring (REM). Without limitation, examples of signal metrics and/or parameters determined during REM may include: a received signal strength indicator (RSSI) of at least one channel in at least one RF band; a Physical Cell ID (PCI) of at least one nearby base station 100; a frequency used (e.g., an Evolved-UTRA Absolute Radio Frequency Number (EARFCN)) by at least one nearby base station 100; an E-UTRAN Cell Global Identifiers (ECGI) of at least one nearby base station 100; a reference signal transmit power of at least one nearby base station 100; and/or a PRACH Root Sequence Index (RSI) of at least one nearby base station 100. Other parameters that may be determined during REM include a Tracking Area Code (TAC), Zero Correlation Zone Configuration (which is related to RACH), and/or a Preamble initial receive target power (PIRTP).

In some configurations, a self-organizing network (SON) module 108A-C in a base station 100 may utilize the REM results to configure the base station 100. For example, the SON module 108 may use the REM results from at least one base station 100 to determine the ideal PCI, RSI, neighbor list, and/or reference signal transmit power for the at least one base station 100. The SON module 108A may be implemented in the baseband controller 104 (or an RP 106) in a C-RAN 100A implementation. The SON module 108B may be implemented in the small cell 100B itself in a small cell 100B implementation. The SON module 108C may be implemented in the macro base station 100C itself in a macro base station 100C implementation. In a 5G implementation, the SON module 108 may be implemented in a centralized, external server (not shown).

In some configurations, the SON module 108 may implement a number of functions. For example, functions implemented by the SON module 108 may include functions for auto configuration of the PCI, RSI and TAC, e.g., when the base station 100 is initialized. The SON module 108 may also implement functions to detect and correct for PCI and RSI collision during normal operation if the nearby base station's 100 configuration changes after initialization. In addition, the SON module 108 may also implement other functions, such as optimization of Preamble initial receive target power (PIRTP) and handover thresholds. In some configurations, one or more of the SON module 108 functions may be based on the REM results from one or more base stations 100.

Some conventional base station transceivers 118 utilize a duplexer to share an antenna between a receive path (e.g., receive circuitry) and a transmit path (e.g., transmit circuitry). Implementing REM in such a configuration may require additional circuitry to share existing antennas, as described below. This additional circuitry may dissipate power in the transceiver and prevent the antenna from reaching a desired power level. Accordingly, the present systems and methods may utilize a REM module inside the base station 100 to perform REM. The REM module may have a dedicated antenna and eliminate the need for at least some of the additional circuitry. This may enable the base station 100 to operate normally (e.g., to transmit and/or receive RF signals) while REM is being performed (as opposed to ceasing all transmissions during REM).

Figure 2:
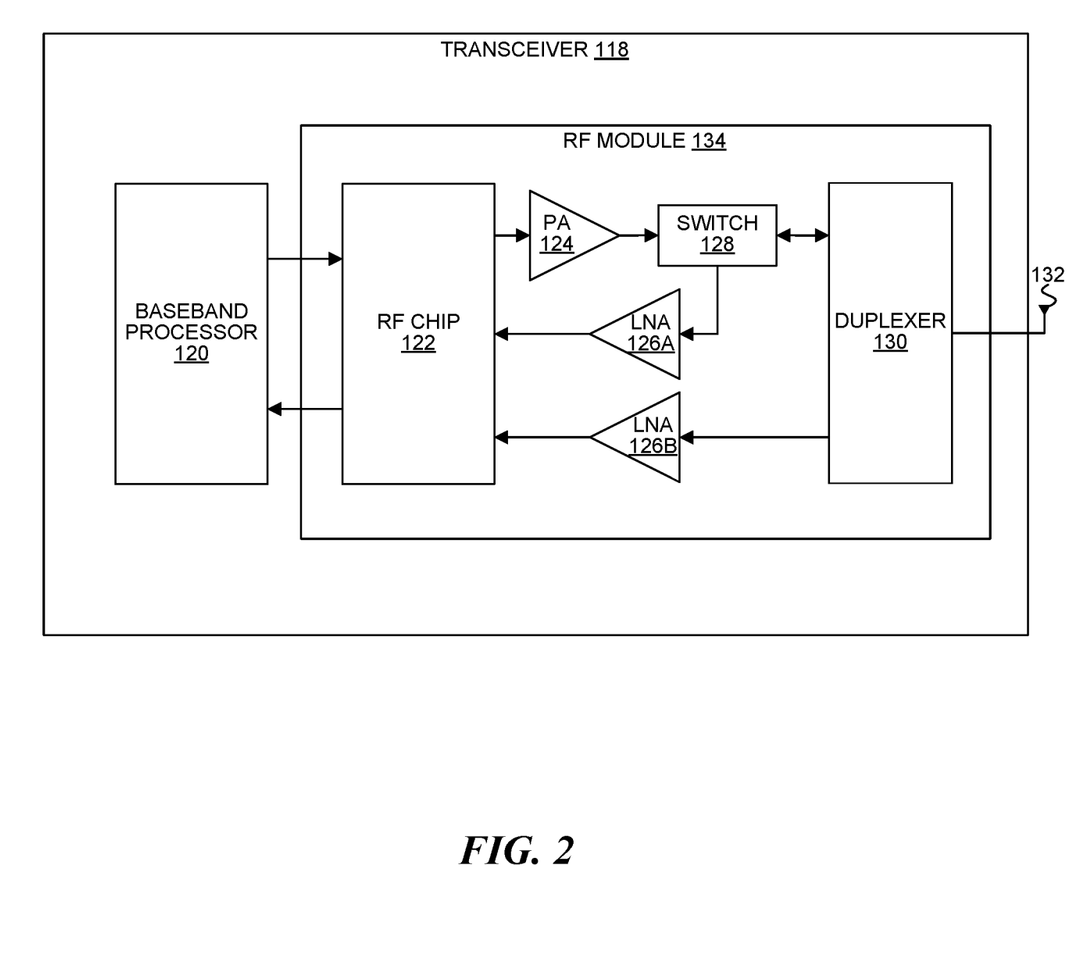
FIG. 2 is a block diagram illustrating an example transceiver implementing REM.

FIG. 2 is a block diagram illustrating an example transceiver 118 implementing REM, e.g., in a base station 100. The transceiver 118 may include a baseband processor 120 and an RF module 134. The baseband processor 120 may be configured to execute instructions executable to perform at least some of the functionality of the base station 100 in which the transceiver 118 resides, e.g., managing radio functions in the base station 100. For example, in a small cell 100B implementation, the baseband processor 120 may implement operations, administration and management (OAM) functions as well as the wireless protocol layers, e.g., LTE S1 Application Protocol (S1AP), GPRS Tunneling Protocol User Plane (GTP-U), Radio Resource Control (RRC), Packet Data Convergence Protocol (PDCP), Radio Link Control (RLC), Medium Access Control (MAC), and/or other physical layer functions. In a C-RAN 100A implementation, the baseband processor 120 (in an RP 106) may implement at least a portion of the physical layer; operations, administration and management (OAM) functions; and a radio controller.

The baseband processor 120 may be implemented using a microprocessor (e.g., an ARM), a special purpose microprocessor (e.g., a digital signal processor (DSP)), a microcontroller, a programmable gate array, a Field Programmable Gate Array (FPGA), an application specific integrated circuit (ASIC), etc.

The RF module 134 may include an RF chip 122 and a duplexer 130 connected to an antenna 132. The RF chip 122 may be coupled to the duplexer 130 via various circuitry, such as a power amplifier (PA) 124, a switch 128, and two low-noise amplifiers (LNAs) 126A-B. The RF chip 122 may include circuitry configured to at least (1) upconvert baseband signals from the baseband processor 120 into RF signals; and/or (2) downconvert RF signals from the duplexer 130 into baseband signals. The RF chip 122 may include tunable circuitry configured to tune to a particular frequency. While FIG. 2 is illustrated with a single antenna 132, any number of antennas may be coupled to the transceiver 118 and/or duplexer 130.

The duplexer 130 may include a transmit filter that filters for a transmit filter frequency (or range of frequencies) and a receive filter that filters for a receive filter frequency (or range of frequencies). In some configurations, the transmit filter frequency and the receive filter frequency may be separated by 10-15 MHz.

The REM process may listen to other nearby base stations 100. Accordingly, a transmit chain and a receive chain may share access to the transmit filter in the duplexer 130 using the switch 128. For example, the power amplifier 124 may amplify the RF signals before passing through the switch to the transmit filter in the duplexer 130 and antenna 132. Additionally, the first low-noise amplifier 126 may amplify RF signals received from the duplexer 130 (e.g., at the transmit filter frequency or frequencies) via the switch 128 before passing the amplified RF signal to the RF chip 122 for downconversion to a baseband signal.

Therefore, the switch 128 enables the REM process to tap into the transmit filter frequency (or frequencies) to receive RF signals transmitted by other base stations 100. However, the switch 128 will dissipate some power in the transmit chain, e.g., 0.25-0.5 or 1.0 dB, depending on the frequency of the RF signal being transmitted. Due to the power dissipation, the power amplifier 124 (in the transmit chain) may not have sufficient gain necessary to achieve the desired power level at the antenna 132 for transmitted signals. Furthermore, the example configuration in FIG. 2 may require the RF chip 122 and baseband processor 120 to implement the receive function (and the baseband processor 120 house instructions implementing the REM process) if REM is implemented.

Additionally, REM could not be performed while the base station 100 was transmitting or otherwise receiving RF signals. For example, the transceiver 118 could not communicate (e.g., on data or control channels) with UEs 110 during the REM process. Instead, the base station 100 using the transceiver of FIG. 2 would have to cease all RF transmissions and receptions (not relating to REM) during the REM process, e.g., for 15 minutes.

Figure 3:
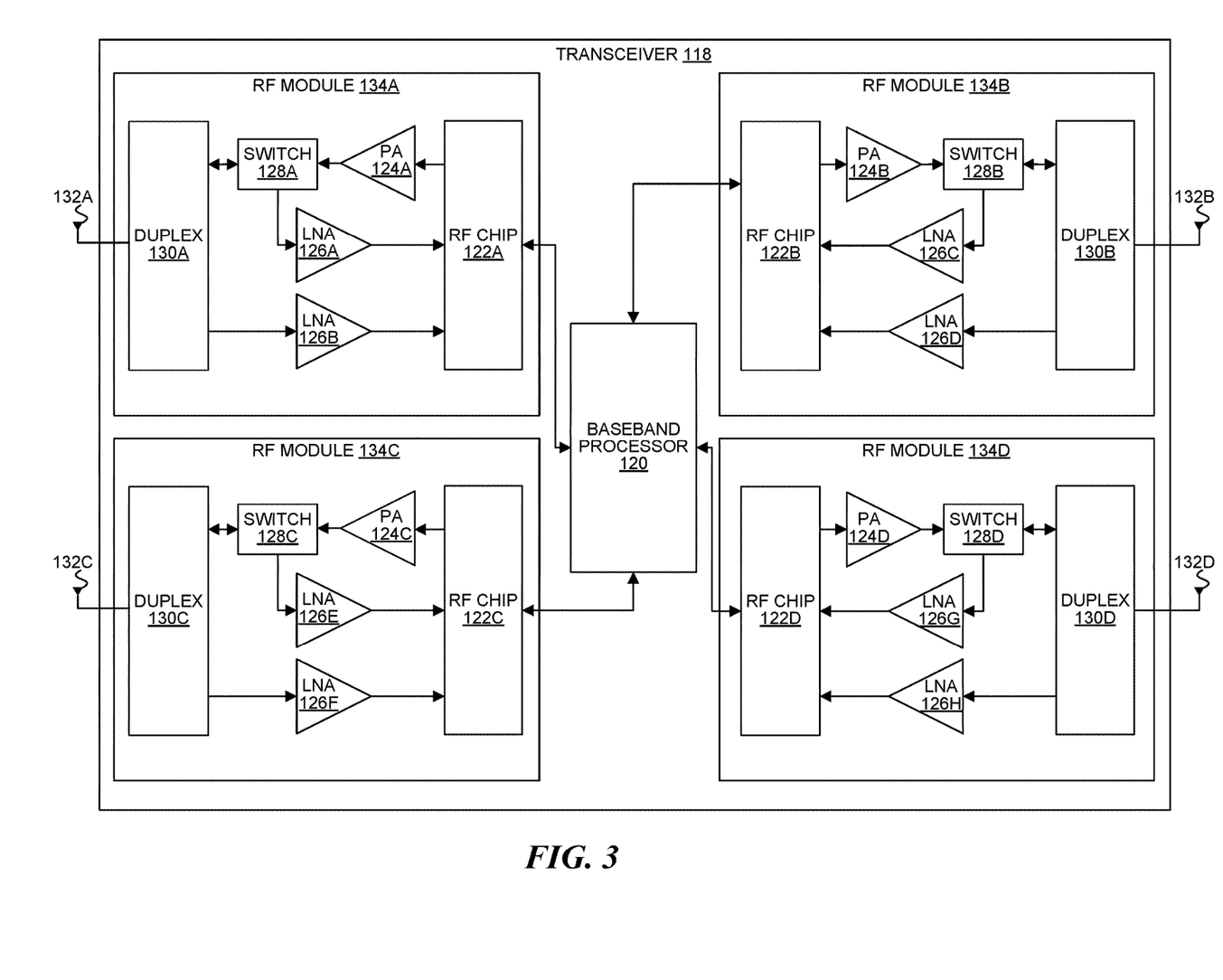
FIG. 3 is a block diagram illustrating an example multi-band, multi-carrier transceiver implementing REM.

FIG. 3 is a block diagram illustrating an example multi-band, multi-carrier transceiver 118 implementing REM, e.g., in a base station 100. The multi-band, multi-carrier transceiver 118 may similarly include a baseband processor 120 as described in FIG. 2. However, the multi-band, multi-carrier transceiver 118 in FIG. 3 may include a plurality of RF modules 134A-D, e.g., each being configured to transmit and/or receive on a different frequency band or carrier. Each RF module 134 may be communicatively coupled to a respective antenna 132A-D. While four RF modules 134 and antennas 132 are illustrated, it is understood that any number of RF modules 134 and/or antennas 132 may be used in the multi-band, multi-carrier transceiver 118.

Each RF module 134 may include an RF chip 122 that communicates with the baseband processor 120 and a duplexer 130 coupled to a respective antenna 132. The RF chip 122 in each RF module 134 may be coupled to the respective duplexer 130 via a respective power amplifier 124A-D, a respective switch 128A-D, and two respective low-noise amplifiers 126A-H.

However, the example multi-band, multi-carrier transceiver 118 suffers from the same drawbacks as the transceiver illustrated in FIG. 2: (1) power dissipation in the switches 128 make it difficult to achieve the desired power level at the antennas 132 for transmitted signals; (2) the RF chips 122 and baseband processor 120 have to implement the receive function (and the baseband processor 120 house instructions implementing the REM process); and (3) REM could not be performed by a given RF module 134 while the module was otherwise receiving or transmitting RF signals, e.g., with UEs 110. In order to overcome these shortcomings, an additional RF module and antenna (not shown in FIG. 3) may be implemented and dedicated to the REM process, as described below.

Figure 4:
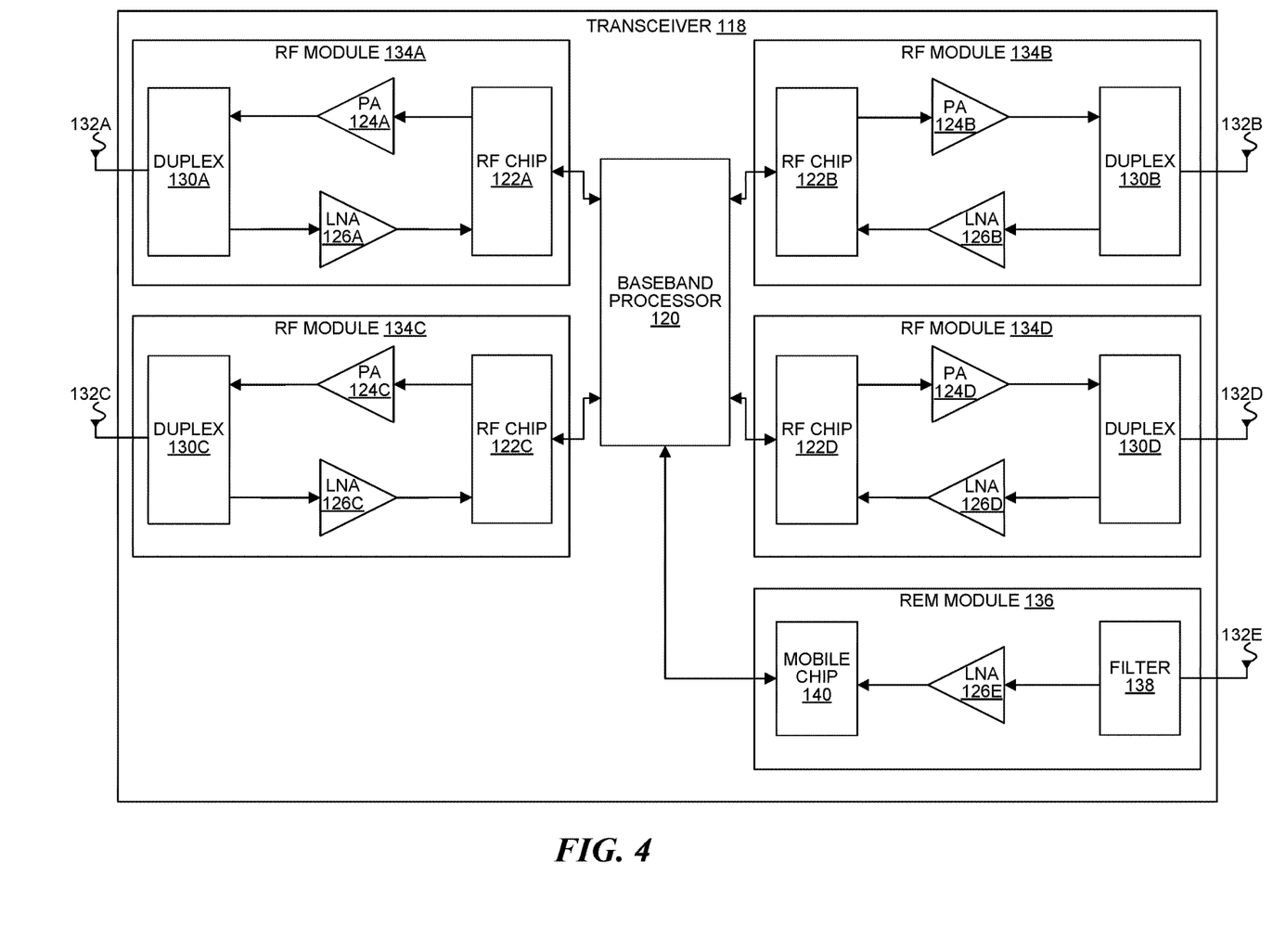
FIG. 4 is a block diagram illustrating another example multi-band, multi-carrier transceiver.

FIG. 4 is a block diagram illustrating another example multi-band, multi-carrier transceiver 118. The example multi-band, multi-carrier transceiver 118 in FIG. 4 may include many of the same components as the example multi-band, multi-carrier transceiver 118 in FIG. 3, e.g., baseband processor 120 and RF modules 134A-D with RF chips 122A-D, duplexers 130A-D, power amplifiers 124A-D, and low-noise amplifiers 126A-D. Unlike FIG. 3, however, the multi-band, multi-carrier transceiver 118 in FIG. 4 implements an additional REM module 136 and antenna 132E that may be dedicated to the REM process. In other words, in one configuration, the dedicated antenna 132E of the REM module 136 may not be used for RF transmissions or receiving RF signals other than the RF signals received during the REM process. While four RF modules 134 and antennas 132 are illustrated, it is understood that any number of RF modules 134 and/or antennas 132 may be used in the multi-band, multi-carrier transceiver 118.

The REM module 136 may include a mobile chip 140, a low-noise amplifier 126E, and a filter 138. In some configurations, the mobile chip 140 may be smaller and/or consume less power than each RF chip 122. For example, the mobile chip 140 may include circuitry designed for a mobile, battery-powered UE 110 but used in the REM module 136 of a base station 100. In some configurations, the entire REM module 136 may be sold as a commercial unit, e.g., based on a CAT-M1. This type of commercial module has been prohibitively expensive for use as a dedicated REM module 136 until recently.

Similar to the RF modules 134, the REM module 136 may include a filter 138 that is communicatively coupled to an antenna 132E that receives RF signals. The filter 138 may filter for a particular transmit frequency (or band of frequencies) of nearby base stations 100. The filter 138 may be communicatively coupled to a low-noise amplifier 126E that amplifies received RF signals before sending to the mobile chip 140. The mobile chip 140 may include circuitry configured to at least (1) upconvert baseband signals from the baseband processor 120 into RF signals; and/or (2) downconvert RF signals from the duplexer 130 into baseband signals.

In some configurations, the instructions executable to monitor and determine REM parameter(s) during REM will execute on the mobile chip 140. The baseband processor 120 may include instructions executable to tune (e.g., band-lock) the mobile chip 140 to a particular frequency band (e.g., LTE band 1), after which the mobile chip 140 may determine at least one REM parameter for an Absolute Radio Frequency Numbers (ARFCNs) in that frequency band and report back to baseband processor 120. In some configurations, the mobile chip 140 may sequentially tune to each ARFCN in the particular frequency band and determine at least one REM parameter for each ARFCN.

The baseband processor 120 may trigger the REM process by indicating at least one frequency band and sending an instruction to the mobile chip 140 to determine REM parameter(s). This may include the baseband processor 120 calling a method or function implemented by the mobile chip 140, e.g., in a library of functions, such as an application programming interface, implemented by the mobile chip 140. In some configurations, the at least one frequency band may be passed to the mobile chip 140 as a parameter in the method or function call. Alternatively, the indication of the at least one frequency band and the instruction may be two distinct commands from the baseband processor 120. In response to the instruction(s), the mobile chip 140 may perform REM by tuning to the at least one indicated frequency band and determining at least one REM parameter associated with nearby base stations 100 transmitting on the indicated frequency band.

For example, the at least one REM parameter (determined during REM) may include, without limitation: a received signal strength indicator (RSSI) of at least one channel in at least one RF band; a Physical Cell ID (PCI) of at least one nearby base station 100; a frequency used (e.g., an Evolved-UTRA Absolute Radio Frequency Number (EARFCN)) by at least one nearby base station 100; an E-UTRAN Cell Global Identifiers (ECGI) of at least one nearby base station 100; a reference signal transmit power of at least one nearby base station 100; a PRACH Root Sequence Index (RSI) of at least one nearby base station 100; a Tracking Area Code (TAC) of at least one nearby base station 100; a Zero Correlation Zone Configuration (which is related to RACH) of at least one nearby base station 100; and/or a Preamble initial receive target power (PIRTP) of at least one nearby base station 100. In some examples, a single instruction from the baseband processor 120 may trigger the mobile chip 140 to sequentially tune to multiple frequency bands, e.g., tune to a first frequency band and collect at least one REM parameter associated with at least one nearby base station 100, then tune to a second frequency band and collect at least one REM parameters associated with at least one nearby base station 100, etc.

Additionally or alternatively, a single instruction may cause the mobile chip 140 to collect more than one REM parameter, e.g., that the mobile chip 140 sends to the baseband processor 120 in a single report. For example, in response to a single instruction from the baseband processor 120, the mobile chip 140 may collect some, but not all REM parameters. Once collected, the mobile chip 140 may send a single report to the baseband processor indicating the collected information. The baseband processor 120 may optionally send one or more subsequent instructions to the mobile chip 140 to collect the remaining REM parameters, e.g., which are individually (or collectively) reported back to the baseband processor 120.

In some configurations, the mobile chip 140 may send all information collected for a particular frequency band, during REM, to the baseband processor 120 in a single report. In some configurations, the mobile chip 140 may send all information collected for multiple frequency bands, during REM, to the baseband processor 120 in a single report.

Since the example multi-band, multi-carrier transceiver 118 includes the additional REM module 136, the other RF modules 134A-D do not require switches 128 like the example transceivers 118 illustrated in FIGS. 2-3. Accordingly, the power amplifiers 124A-D in the transmit chains may connect directly to the respective duplexers 130A-D (without a switch 128).

The baseband processor 120 and RF modules 134A-D may be located on a baseband card, e.g., a single continuous substrate that supports and electrically connects various circuitry, such as a printed circuit board (PCB). The REM module 136 may similarly be located on a secondary card in the same physical housing as the baseband card. Alternatively, the REM module 136 may also be located on the baseband card.

The configuration illustrated in FIG. 4 may include some modifications to the baseband card (with the baseband processor 120) and/or the secondary card (with the REM module 136). For example, an interface to be added or exposed on baseband card beyond what is otherwise available. The baseband processor 120 may interface with the REM module 136 using at least one interface, e.g., a universal asynchronous receiver-transmitter (UART) interface and/or a universal serial bus (USB) interface. In some configurations, the baseband processor 120 may interface with the REM module 136 using a USB to UART bridge, e.g., circuitry configured to enable connectivity of a first device communicating on a USB interface with a second device communicating on a UART interface.

Additionally or alternatively, the instructions in the mobile chip 140 may be modified. For example, if a commercial REM module 136 is used, additional functionality may be added to the mobile chip 140 to externally report the REM parameter(s) to the baseband processor 120, which otherwise may be used only internally in the mobile chip 140. In other words, the mobile chip 140 may be modified to report at least one REM parameter that is normally only used internally. Optionally, the mobile chip 140 may also be modified to operate without a subscriber identity module (SIM) card. Optionally, the mobile chip 140 may have its transmit functionality disabled if it is dedicated only to REM, which requires receiving RF signals, not transmitting RF signals.

The baseband processor 120 may receive at least one report from the REM module 136 (across at least one frequency band) and send REM results to a self-organizing network (SON) module 108. For example, the self-organizing network (SON) module 108 may configure parameters of at least one base station 100 (e.g., determine the ideal PCI, RSI, neighbor list, and/or reference signal transmit power for the at least one base station 100) based on the REM results. The SON module 108 may be implemented in the baseband controller 104 (or an RP 106) in a C-RAN 100A implementation. The SON module 108 may be implemented in the small cell 100B itself in a small cell 100B implementation. The SON module 108 may be implemented in the macro base station 100C itself in a macro base station 100C implementation. In a 5G implementation, the SON module 108 may be implemented in a centralized, external server (not shown).

The example multi-band, multi-carrier transceiver 118 in FIG. 4 may include advantages over the example multi-band, multi-carrier transceiver 118 in FIG. 3 and the transceiver 118 in FIG. 2. Specifically, using a dedicated REM module 136 means that the RF modules 134 do not require a power-dissipating switch 128 (to enable REM), which makes it easier to achieve a desired power level at each antenna 132A-D of the RF modules 134. Additionally, by moving the majority of the REM processing to the mobile chip 140 (instead of the RF chip(s) 122), the RF chip(s) 122 do not require modification to perform REM. Additionally, using a dedicated REM module 136 enables a base station 100 to perform REM and simultaneously receive and/or transmit other RF signals, e.g., with UEs 110. In other words, the base station 100 using the transceiver 118 of FIG. 4 may operate normally while also performing REM.

Optionally, the dedicated REM module 136 may also be used to detect if/when the other antennas 132A-D (coupled to the RF modules 134) cease transmitting. For example, if the REM antenna 132E is sufficiently isolated from the other antennas 132A-D utilized by the RF modules 134A-D, the REM module 136 may be used to detect if other antennas 132A-D stop transmitting, e.g., if they are broken or for any other reason. This may be used to indicate when one or more RF modules 134 is attempting to transmit without a minimum voltage standing wave ratio (VSWR).

Figure 5:
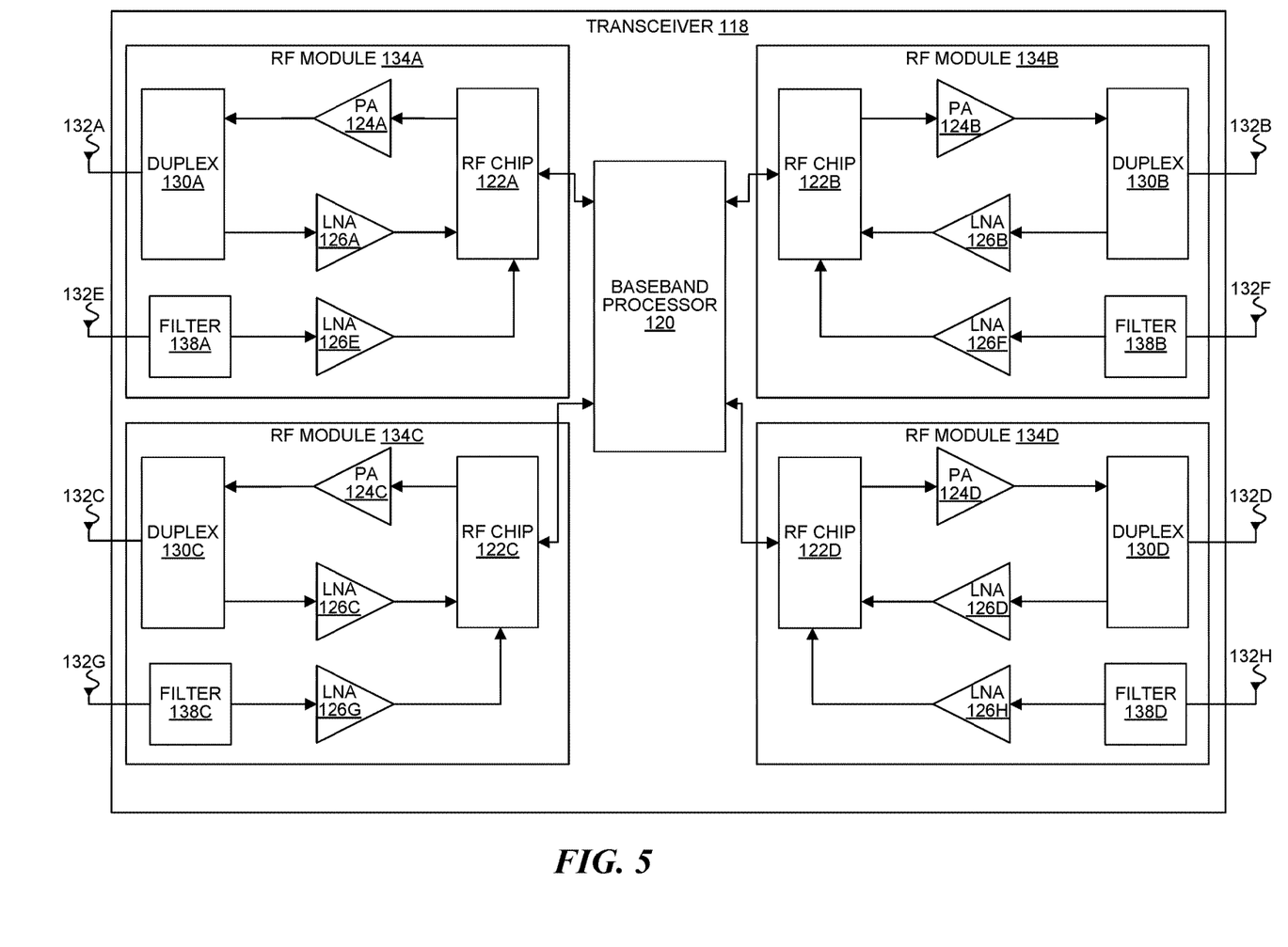
FIG. 5 is a block diagram illustrating another example multi-band, multi-carrier transceiver.

FIG. 5 is a block diagram illustrating another example multi-band, multi-carrier transceiver 118. The example multi-band, multi-carrier transceiver 118 in FIG. 5 may include many of the same components as the example multi-band, multi-carrier transceiver 118 in FIG. 4, e.g., baseband processor 120 and RF modules 134A-D with RF chips 122A-D, duplexers 130A-D, power amplifiers 124A-D in a transmit chain, and low-noise amplifiers 126A-D in a receive chain.

Unlike FIG. 4, however, each RF module 134 further includes an additional low-noise amplifier 126E-H and antenna 132E-H that is coupled to the respective RF chip 122. This additional receive chain in each RF module 134 may be used only for receiving RF signals as part of the REM process. Optionally, the additional receive chain may also be used to detect if other antennas 132A-D stop transmitting, e.g., if they are broken or for any other reason.

The configuration of FIG. 5 eliminates the power-dissipating switch 128 but may increase costs compared to FIG. 4 because of the added antennas 132E-H. Furthermore, the RF chips 122 in FIG. 5 would be implementing at least some of the REM instructions (along with the baseband processor 120) in contrast to FIG. 4 where a separate mobile chip 140 implements much of the REM instructions.

For example, the RF chips 122 may be reconfigured to receive the transmit frequency of nearby base stations 100 and additional RF filters 138A-D (between the LNAs 126E-H and the dedicated antennas 132E-H) may be used and configured based on a desired bandwidth. In the FIG. 5 configuration, the baseband processor 120 may also perform some processing to detect LTE and/or 5G signals from received digital IQ samples.

In the past, mobile chips 140 were expensive and consumed more power than current-generation mobile chips 140. Accordingly, base stations 100 implemented the REM in software and FPGA (in baseband), which is difficult to do and may require processing resources to be available (but are only used occasionally). Accordingly, the configuration of FIG. 4 may have certain advantages over the configuration of FIG. 5.

Figure 6:
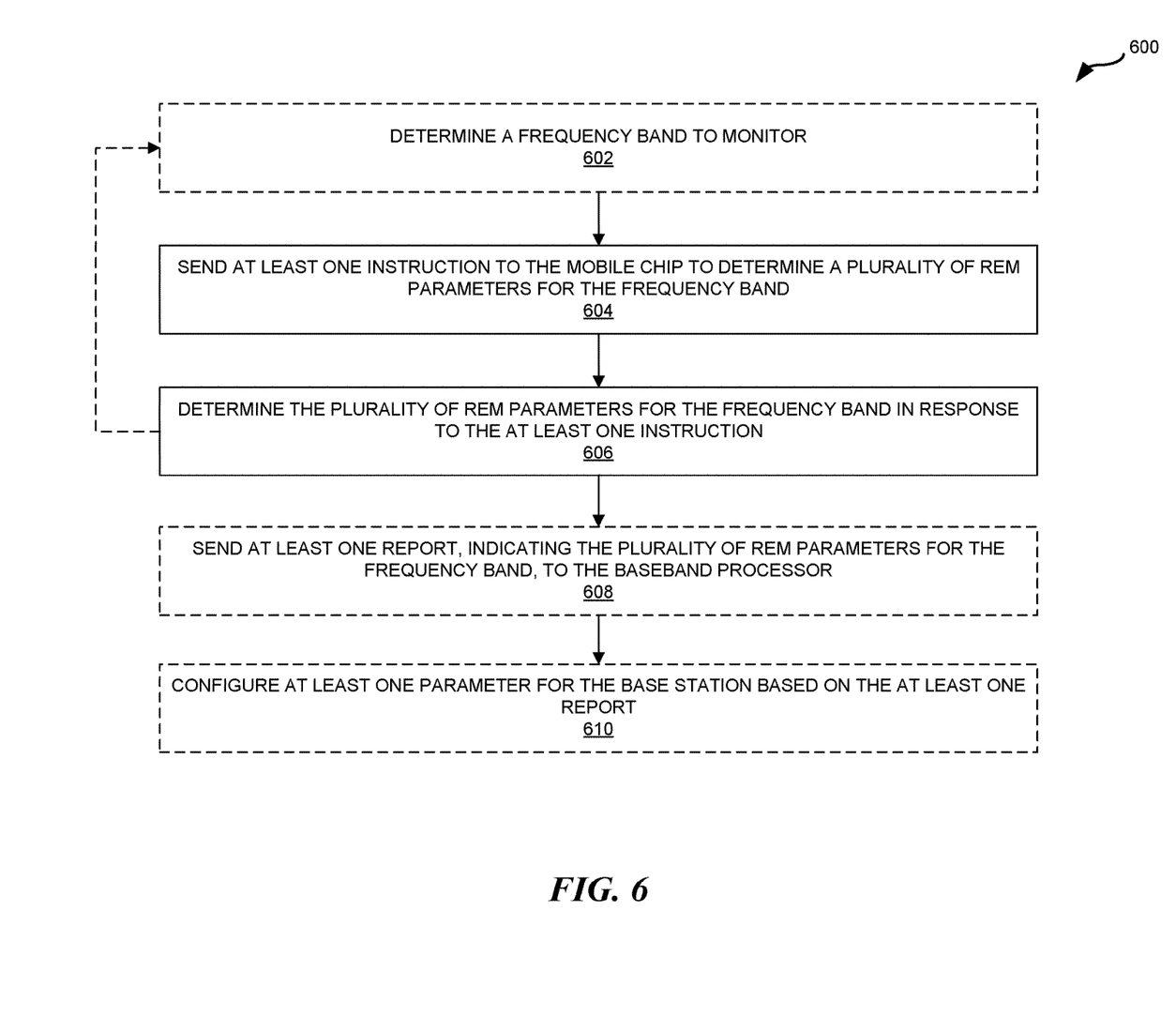
FIG. 6 is a flow diagram illustrating a method for radio environment monitoring (REM) in a base station.

FIG. 6 is a flow diagram illustrating a method 600 for radio environment monitoring (REM) in a base station 100. The method 600 may be implemented by a transceiver 118 in a base station 100. The transceiver 118 may be configured as illustrated in FIG. 4. Specifically, the transceiver 118 may include a baseband processor 120, at least one RF module 134 (each with an RF chip 122, duplexer 130, a power amplifier 124 a low-noise amplifier 126, and antenna 132A-D), and a dedicated REM module 136 (with a mobile chip 140, a low-noise amplifier 126, a filter 138, and antenna 132E). The base station 100 may be a cloud radio access network (C-RAN) 100A, a small cell 100B, or a macro base station 100C. If the base station is a C-RAN 100A, the transceiver 118 may be in an RP 106.

The method 600 begins at optional step 602 when the transceiver 118 determines a frequency band to monitor. For example, the determination may be implicit in a decision to perform REM at the base station 100. In some configurations, the base station may be configured to perform different levels of REM (e.g., Level-1 REM, Level-2 REM, Level-3 REM), where the level of REM may indicate the frequency band or bands to monitor. In some configurations, the level of REM may be based on which specific system information blocks (SIBs) or other parameters that UEs 110 are supposed to report to the base station 100, e.g., SIB information of the neighbors gathered while in idle mode (not connected mode).

The base station 100 may receive an instruction to perform REM from an controlling device. If the base station 100 is a C-RAN 100A, the RP 106 may receive an instruction to perform REM from the baseband controller 104, e.g., periodically or as part of the RP 106 being initialized.

In some configurations, tuning the mobile chip 140 may include band-locking the mobile chip 140 onto the determined frequency band. This may include the baseband processor 120 sending a control signal to the mobile chip 140 commanding the mobile chip 140 to tune to a particular frequency band.

The method 600 proceeds at step 604 when the baseband processor 120 sends at least one instruction to the mobile chip 140 to determine a plurality of REM parameters for the frequency band. This may include the baseband processor 120 calling a method or function, e.g., in a library of functions implemented by the mobile chip 140 and available to the baseband processor 120. In some configurations, the frequency band is passed to the mobile chip 140 as a parameter in the method or function call.

The method 600 proceeds at step 606 when the mobile chip 140 determines the plurality of REM parameters for the frequency band in response to receiving the at least one instruction. As described in FIG. 7 below, step 606 may include the mobile chip 140 sequentially tuning to each ARFCN in the frequency band and determining the plurality of REM parameters at each ARFCN in the frequency band.

For example, the plurality of REM parameters may include, without limitation: the RSSI of various channels in the indicated RF band, PCI(s) of nearby base station(s) 100, the EARFCN(s) being used by nearby base station(s) 100, the ECGI(s) of nearby base station(s) 100, the reference signal transmit power(s) of nearby base station(s) 100, a PRACH RSI of at least one nearby base station 100, a TAC of at least one nearby base station 100, a Zero Correlation Zone Configuration of at least one nearby base station 100, and/or a PIRTP of at least one nearby base station 100.

Optionally, the mobile chip 140 may determine the plurality of REM parameters for more than one frequency band, e.g., the mobile chip 140 may determine a first plurality of REM parameters for a first frequency band and a second plurality of REM parameters for a second frequency band. In other words, steps 602-606 may be performed iteratively where it is desired to determine the plurality of REM parameters for more than one frequency band. In such a configuration, the plurality of REM parameters for multiple frequency bands may be determined in response to a single instruction from the baseband processor 120 or each plurality of REM parameters may be determined in response to a separate instruction for each frequency band.

The method 600 proceeds at optional step 608 when the mobile chip 140 sends at least one report, indicating the plurality of REM parameters, to the baseband processor 120. In some configurations, the mobile chip 140 sends a single report for all REM parameters determined for the frequency band. In other configurations, the mobile chip 140 sends a separate report for each REM parameter determined for the frequency band.

If the mobile chip 140 determines the plurality of REM parameters for more than one band, the mobile chip 140 may send a single report to the baseband processor 120 indicating the REM parameters for a single frequency band or for multiple frequency bands.

The method 600 proceeds at optional step 610 when at least one parameter for the base station is configured based on the at least one report from the mobile chip 140 (that indicates the plurality of REM parameters for the frequency band). This may include a self-organizing network (SON) module determining the PCI, RSI, neighbor list, and/or reference signal transmit power for the base station 100 based on the at least one report. The SON module 108 may be implemented in the baseband controller 104 (or an RP 106) in a C-RAN 100A implementation. The SON module 108 may be implemented in the small cell 100B itself in a small cell 100B implementation. The SON module 108 may be implemented in the macro base station 100C itself in a macro base station 100C implementation. In a 5G implementation, the SON module 108 may be implemented in a centralized, external server (not shown).

Figure 7:
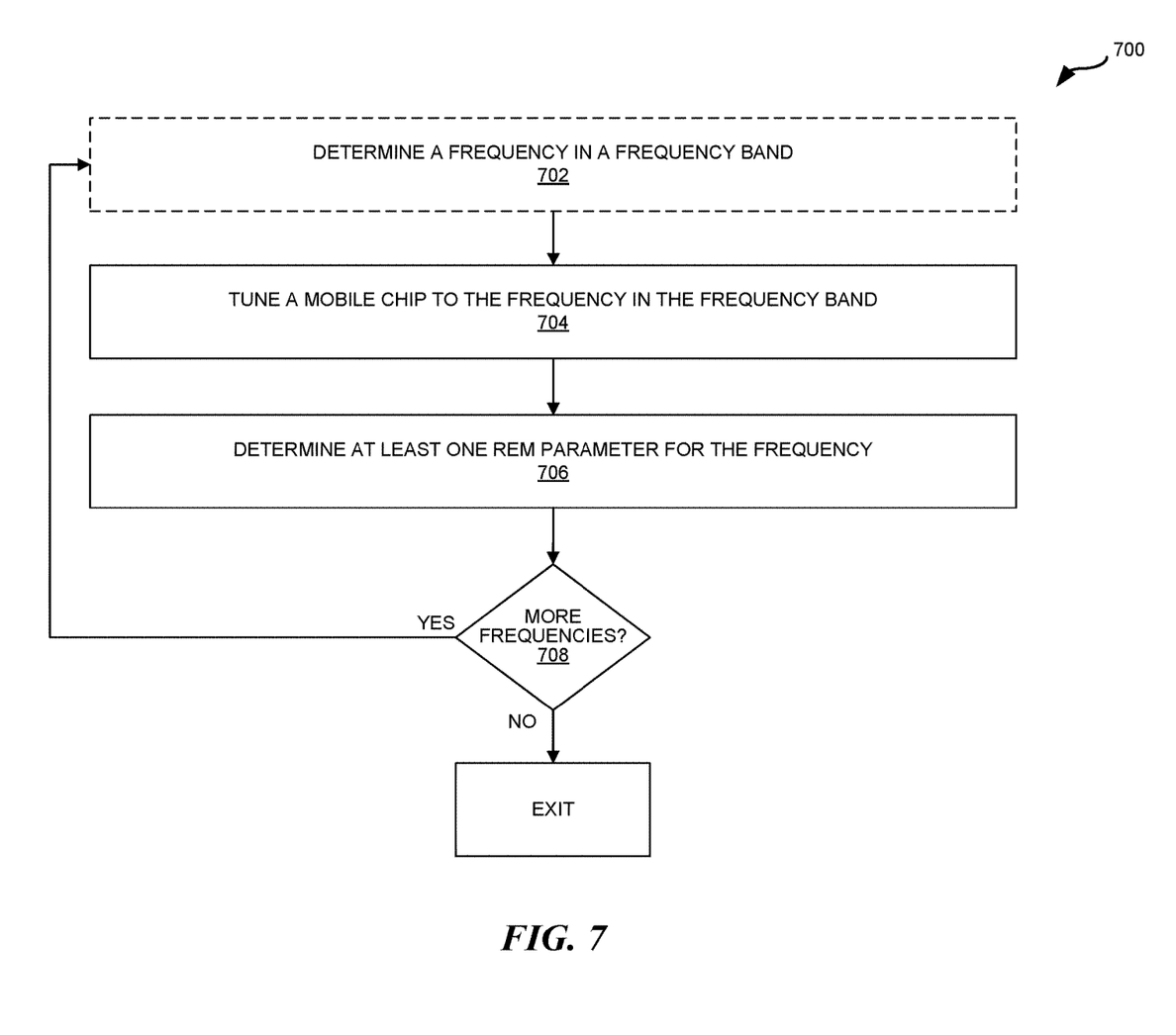
FIG. 7 is a flow diagram illustrating a method for determining a plurality of REM parameters for a frequency band.

FIG. 7 is a flow diagram illustrating a method 700 for determining a plurality of REM parameters for a frequency band. The method 700 may be one possible implementation of step 606 in the method 600 of FIG. 6. Alternatively, the method 700 of FIG. 7 may be performed independently of the method 600 of FIG. 6.

The method 700 may be implemented by a transceiver 118 in a base station 100. The transceiver 118 may be configured as illustrated in FIG. 4. Specifically, the transceiver 118 may include a baseband processor 120, at least one RF module 134 (each with an RF chip 122, duplexer 130, a power amplifier 124 a low-noise amplifier 126, and antenna 132A-D), and a dedicated REM module 136 (with a mobile chip 140, a low-noise amplifier 126, a filter 138, and antenna 132E). The base station 100 may be a cloud radio access network (C-RAN) 100A, a small cell 100B, or a macro base station 100C. If the base station is a C-RAN 100A, the transceiver 118 may be in an RP 106.

The method 700 begins at optional step 702 when the transceiver 118 determines a frequency (e.g., an ARFCN) in a frequency band to monitor. The frequency band may be a frequency band determined by a baseband processor 120, e.g., in step 602 of FIG. 6. In some configurations, the first determined frequency may be the first ARFCN, last ARFCN, or any other frequency/ARFCN in the frequency band. An ARFCN is a unique number given to a radio channel and may be used to calculate an exact frequency of the radio channel. Accordingly, the terms "frequency" and "ARFCN" are used interchangeably herein.

The method 700 proceeds at step 704 when the baseband processor 120 (in the base station 100) tunes a mobile chip 140 to the frequency in the frequency band. This may include the baseband processor 120 sending a control signal to the mobile chip 140 commanding the mobile chip 140 to tune to a particular ARFCN in the frequency band. In some cases, tuning the mobile chip 140 may include frequency-locking the mobile chip 140.

The method 700 proceeds at step 706 when the mobile chip 140 determines at least one REM parameter for the frequency. In some configurations, the mobile chip 140 may determine multiple REM parameters for the frequency.

The method 700 proceeds at step 708 where it is determined whether there are more frequencies (in the frequency band) to monitor. This determination may be made by the baseband processor 120 and/or the mobile chip 140.

If there are more frequencies in the frequency band that need to be monitored (e.g., at least one parameter has not yet been determined for at least one desired ARFCN in the frequency band), a new frequency in the frequency band may be determined. In other words, the mobile chip 140 may sequentially tune to multiple (e.g., each) ARFCN in the particular frequency band and determine at least one REM parameter for each ARFCN.

However, if there are no more frequencies in the frequency band that need to be monitored (e.g., at least one REM parameter has been determined for all desired ARFCNs in the frequency band), the method 700 may exit, e.g., proceed to optional step 608 in the method 600 of FIG. 6.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

Terminology

Brief definitions of terms, abbreviations, and phrases used throughout this application are given below.

The term "determining" and its variants may include calculating, extracting, generating, computing, processing, deriving, modeling, investigating, looking up (e.g., looking up in a table, a database or another data structure), ascertaining and the like. Also, "determining" may also include receiving (e.g., receiving information), accessing (e.g., accessing data in a memory) and the like. Also, "determining" may include resolving, selecting, choosing, establishing and the like.

The phrase "based on" does not mean "based only on," unless expressly specified otherwise. In other words, the phrase "based on" describes both "based only on" and "based at least on". Additionally, the term "and/or" means "and" or "or". For example, "A and/or B" can mean "A", "B", or "A and B". Additionally, "A, B, and/or C" can mean "A alone," "B alone," "C alone," "A and B," "A and C," "B and C" or "A, B, and C."

The terms "connected", "coupled", and "communicatively coupled" and related terms may refer to direct or indirect connections. If the specification states a component or feature "may," "can," "could," or "might" be included or have a characteristic, that particular component or feature is not required to be included or have the characteristic.

The terms "responsive" or "in response to" may indicate that an action is performed completely or partially in response to another action. The term "module" refers to a functional component implemented in software, hardware, or firmware (or any combination thereof) component.

The methods disclosed herein comprise one or more steps or actions for achieving the described method. Unless a specific order of steps or actions is required for proper operation of the method that is being described, the order and/or use of specific steps and/or actions may be modified without departing from the scope of the claims.

In conclusion, the present disclosure provides novel systems, methods, and arrangements for radio environment monitoring (REM) in a base station. While detailed descriptions of one or more configurations of the disclosure have been given above, various alternatives, modifications, and equivalents will be apparent to those skilled in the art without varying from the spirit of the disclosure. For example, while the configurations described above refer to particular features, functions, procedures, components, elements, and/or structures, the scope of this disclosure also includes configurations having different combinations of features, functions, procedures, components, elements, and/or structures, and configurations that do not include all of the described features, functions, procedures, components, elements, and/or structures. Accordingly, the scope of the present disclosure is intended to embrace all such alternatives, modifications, and variations as fall within the scope of the claims, together with all equivalents thereof. Therefore, the above description should not be taken as limiting.

Example Embodiments

Example 1 includes a base station for performing radio environment monitoring (REM), comprising: a REM module comprising: mobile circuitry communicatively coupled to a baseband processor; and a dedicated antenna; the baseband processor, wherein the baseband processor is configured to send at least one instruction to the mobile circuitry to determine a plurality of REM parameters for a frequency band; and wherein the mobile circuitry is configured to determine the plurality of REM parameters for the frequency band in response to receiving the at least one instruction.

Example 2 includes the base station of Example 1, wherein the mobile circuitry is configured to determine the plurality of REM parameters for the frequency band by sequentially tuning to multiple frequencies in the frequency band and determine at least one REM parameter for each of the multiple frequencies.

Example 3 includes the base station of any of Examples 1-2, wherein the mobile circuitry is further configured to send at least one report, indicating the plurality of REM parameters for the frequency band, to the baseband processor.

Example 4 includes the base station of Example 3, further comprising a self-organizing network (SON) module configured to configure at least one parameter for the base station based on the at least one report from the mobile circuitry.

Example 5 includes the base station of any of Examples 1-4, wherein the plurality of REM parameters comprise a received signal strength indicator (RSSI) of at least one channel in the frequency band.

Example 6 includes the base station of any of Examples 1-5, wherein the plurality of REM parameters comprise a Physical Cell ID (PCI) of at least one nearby base station.

Example 7 includes the base station of any of Examples 1-6, wherein the plurality of REM parameters comprise an Evolved-UTRA Absolute Radio Frequency Number (EARFCN) of at least one nearby base station.

Example 8 includes the base station of any of Examples 1-7, wherein the plurality of REM parameters comprise an E-UTRAN Cell Global Identifier (ECGI) of at least one nearby base station.

Example 9 includes the base station of any of Examples 1-8, wherein the plurality of REM parameters comprise a reference signal transmit power of at least one nearby base station.

Example 10 includes the base station of any of Examples 1-9, wherein the plurality of REM parameters comprise a Physical Random Access Channel (PRACH) Root Sequence Index (RSI) of at least one nearby base station.

Example 11 includes the base station of any of Examples 1-10, wherein the plurality of REM parameters comprise a PRACH Root Sequence Index (RSI) of at least one nearby base station.

Example 12 includes the base station of any of Examples 1-11, wherein the plurality of REM parameters comprise a Tracking Area Code (TAC) of at least one nearby base station.

Example 13 includes the base station of any of Examples 1-12, wherein the plurality of REM parameters comprise a Zero Correlation Zone Configuration of at least one nearby base station.

Example 14 includes the base station of any of Examples 1-13, wherein the plurality of REM parameters comprise a Preamble initial receive target power (PIRTP) of at least one nearby base station.

Example 15 includes the base station of any of Examples 1-14, wherein the REM module and the baseband processor communicate using a universal asynchronous receiver-transmitter (UART) interface, a universal serial bus (USB) interface, or both.

Example 16 includes the base station of any of Examples 1-15, wherein the base station is a cloud radio access network (C-RAN) comprising: a baseband controller; and a plurality of radio points (RPs) configured to exchange radio frequency (RF) signals with a plurality of UEs, wherein each RP is communicatively coupled to the baseband controller via an Ethernet network.

Example 17 includes the base station of Example 16, wherein the REM module and the baseband processor are located in one of the RPs.

Example 18 includes the base station of any of Examples 16-17, wherein a self-organizing network (SON) module is located in the baseband controller, wherein the SON module is configured to configure at least one parameter for the base station based on the at least one report from the mobile circuitry.

Example 19 includes the base station of any of Examples 16-18, wherein a self-organizing network (SON) module is located in the one of the RPs, wherein the SON module is configured to configure at least one parameter for the one of the RPs based on the at least one report from the mobile circuitry.

Example 20 includes the base station of any of Examples 1-19, wherein the mobile circuitry is configured to determine the plurality of REM parameters for the frequency band while the base station is otherwise receiving radio frequency (RF) signals, transmitting RF signals, or both.

Example 21 includes the base station of any of Examples 1-20, wherein the REM module is used to detect if at least one other antenna, coupled to a radio frequency (RF) module in the base station, stops transmitting.

Example 22 includes a method for radio environment monitoring (REM) in a base station, wherein the base station comprises a REM module with mobile circuitry and a dedicated antenna, wherein the base station further comprises a baseband processor communicatively coupled to the mobile circuitry, the method comprising: sending at least one instruction to the mobile circuitry to determine a plurality of REM parameters for a frequency band; and determining the plurality of REM parameters for the frequency band in response to the at least one instruction.

Example 23 includes the method of Example 22, wherein the determining the plurality of REM parameters for the frequency band comprises sequentially tuning to multiple frequencies in the frequency band and determining at least one REM parameter for each of the multiple frequencies.

Example 24 includes the method of any of Examples 22-23, further comprising sending at least one report, indicating the plurality of REM parameters for the frequency band, to the baseband processor.

Example 25 includes the method of Example 24, further comprising configuring at least one parameter for the base station based on the at least one report from the mobile circuitry.

Example 26 includes the method of any of Examples 22-25, wherein the plurality of REM parameters comprise a received signal strength indicator (RSSI) of at least one channel in the frequency band.

Example 27 includes the method of any of Examples 22-26, wherein the plurality of REM parameters comprise a Physical Cell ID (PCI) of at least one nearby base station.

Example 28 includes the method of any of Examples 22-27, wherein the plurality of REM parameters comprise an Evolved-UTRA Absolute Radio Frequency Number (EARFCN) of at least one nearby base station.

Example 29 includes the method of any of Examples 22-28, wherein the plurality of REM parameters comprise an E-UTRAN Cell Global Identifier (ECGI) of at least one nearby base station.

Example 30 includes the method of any of Examples 22-29, wherein the plurality of REM parameters comprise a reference signal transmit power of at least one nearby base station.

Example 31 includes the method of any of Examples 22-30, wherein the plurality of REM parameters comprise a Physical Random Access Channel (PRACH) Root Sequence Index (RSI) of at least one nearby base station.

Example 32 includes the method of any of Examples 22-31, wherein the plurality of REM parameters comprise a Tracking Area Code (TAC) of at least one nearby base station.

Example 33 includes the method of any of Examples 22-32, wherein the plurality of REM parameters comprise a Zero Correlation Zone Configuration of at least one nearby base station.

Example 34 includes the method of any of Examples 22-33, wherein the plurality of REM parameters comprise a Preamble initial receive target power (PIRTP) of at least one nearby base station.

Example 35 includes the method of any of Examples 22-34, wherein the at least one instruction is sent to the mobile circuitry using a universal asynchronous receiver-transmitter (UART) interface, a universal serial bus (USB) interface, or both.

Example 36 includes the method of any of Examples 22-35, wherein the plurality of REM parameters are determined for the frequency band while the base station is otherwise receiving radio frequency (RF) signals, transmitting RF signals, or both.

Example 37 includes the method of any of Examples 22-36, further comprising using REM module to detect if at least one other antenna, coupled to a radio frequency (RF) module in the base station, stops transmitting.

What is claimed is:

1. A cloud radio access network (C-RAN) for performing radio environment monitoring (REM), comprising:
   a baseband controller; and
   a plurality of radio points (RPs) implementing a same one or more cells and configured to exchange radio frequency (RF) signals with a plurality of UEs, wherein each RP is communicatively coupled to the baseband controller via an Ethernet network, at least one of the RPs comprising:
      a REM module comprising:
         mobile circuitry communicatively coupled to a baseband processor; and
         a dedicated antenna;
      the baseband processor, wherein the baseband processor is configured to send at least one instruction to the mobile circuitry to determine a plurality of REM parameters for a frequency band; and
      wherein the mobile circuitry is configured to determine the plurality of REM parameters for the frequency band in response to receiving the at least one instruction.

2. The cloud radio access network (C-RAN) of claim 1, wherein the mobile circuitry is configured to determine the plurality of REM parameters for the frequency band by sequentially tuning to multiple frequencies in the frequency band and determine at least one REM parameter for each of the multiple frequencies.

3. The cloud radio access network (C-RAN) of claim 1, wherein the mobile circuitry is further configured to send at least one report, indicating the plurality of REM parameters for the frequency band, to the baseband processor.

4. The cloud radio access network (C-RAN) of claim 3, further comprising a self-organizing network (SON) module configured to configure at least one parameter for the cloud radio access network (C-RAN) based on the at least one report from the mobile circuitry.

5. The cloud radio access network (C-RAN) of claim 1, wherein the plurality of REM parameters comprise a received signal strength indicator (RSSI) of at least one channel in the frequency band.

6. The cloud radio access network (C-RAN) of claim 1, wherein the plurality of REM parameters comprise a Physical Cell ID (PCI) of at least one nearby base station.

7. The cloud radio access network (C-RAN) of claim 1, wherein the plurality of REM parameters comprise an Evolved-UTRA Absolute Radio Frequency Number (EARFCN) of at least one nearby base station.

8. The cloud radio access network (C-RAN) of claim 1, wherein the plurality of REM parameters comprise an E-UTRAN Cell Global Identifier (ECGI) of at least one nearby base station.

9. The cloud radio access network (C-RAN) of claim 1, wherein the plurality of REM parameters comprise a reference signal transmit power of at least one nearby base station.

10. The cloud radio access network (C-RAN) of claim 1, wherein the plurality of REM parameters comprise a Physical Random Access Channel (PRACH) Root Sequence Index (RSI) of at least one nearby base station.

11. The cloud radio access network (C-RAN) of claim 1, wherein the plurality of REM parameters comprise a Tracking Area Code (TAC) of at least one nearby base station.

12. The cloud radio access network (C-RAN) of claim 1, wherein the plurality of REM parameters comprise a Zero Correlation Zone Configuration of at least one nearby base station.

13. The cloud radio access network (C-RAN) of claim 1, wherein the plurality of REM parameters comprise a Preamble initial receive target power (PIRTP) of at least one nearby base station.

14. The cloud radio access network (C-RAN) of claim 1, wherein the REM module and the baseband processor communicate using a universal asynchronous receiver-transmitter (UART) interface, a universal serial bus (USB) interface, or both.

15. The cloud radio access network (C-RAN) of claim 1, wherein a self-organizing network (SON) module is located in the baseband controller, wherein the SON module is configured to configure at least one parameter for the cloud radio access network (C-RAN) based on at least one report from the mobile circuitry.

16. The cloud radio access network (C-RAN) of claim 1, wherein a self-organizing network (SON) module is located in one of the RPs, wherein the SON module is configured to configure at least one parameter for the one of the RPs based on at least one report from the mobile circuitry.

17. The cloud radio access network (C-RAN) of claim 1, wherein the mobile circuitry is configured to determine the plurality of REM parameters for the frequency band while the cloud radio access network (C-RAN) is otherwise receiving radio frequency (RF) signals, transmitting RF signals, or both.

18. The cloud radio access network (C-RAN) base station of claim 1, wherein the REM module is used to detect if at least one other antenna, coupled to a radio frequency (RF) module in the cloud radio access network (C-RAN), stops transmitting.

19. A method for radio environment monitoring (REM) in a cloud radio access network (C-RAN), wherein the cloud radio access network (C-RAN) comprises a baseband controller and a plurality of radio points (RPs) implementing a same one or more cells and configured to exchange radio frequency (RF) signals with a plurality of UEs, at least one of the RPs comprising a REM module with mobile circuitry and a dedicated antenna, wherein the cloud radio access network (C-RAN) further comprises a baseband processor communicatively coupled to the mobile circuitry, the method comprising:
   sending at least one instruction to the mobile circuitry to determine a plurality of REM parameters for a frequency band; and
   determining the plurality of REM parameters for the frequency band in response to the at least one instruction.

20. The method of claim 19, wherein determining the plurality of REM parameters for the frequency band comprises sequentially tuning to multiple frequencies in the frequency band and determining at least one REM parameter for each of the multiple frequencies.

21. The method of claim 19, further comprising sending at least one report, indicating the plurality of REM parameters for the frequency band, to the baseband processor.

22. The method of claim 21, further comprising configuring at least one parameter for the cloud radio access network (C-RAN) based on the at least one report from the mobile circuitry.

23. The method of claim 19, wherein the plurality of REM parameters comprise a received signal strength indicator (RSSI) of at least one channel in the frequency band.

24. The method of claim 19, wherein the plurality of REM parameters comprise a Physical Cell ID (PCI) of at least one nearby base station.

25. The method of claim 19, wherein the plurality of REM parameters comprise an Evolved-UTRA Absolute Radio Frequency Number (EARFCN) of at least one nearby base station.

26. The method of claim 19, wherein the plurality of REM parameters comprise an E-UTRAN Cell Global Identifier (ECGI) of at least one nearby base station.

27. The method of claim 19, wherein the plurality of REM parameters comprise a reference signal transmit power of at least one nearby base station.

28. The method of claim 19, wherein the plurality of REM parameters comprise a Physical Random Access Channel (PRACH) Root Sequence Index (RSI) of at least one nearby base station.

29. The method of claim 19, wherein the plurality of REM parameters comprise a Tracking Area Code (TAC) of at least one nearby base station.

30. The method of claim 19, wherein the plurality of REM parameters comprise a Zero Correlation Zone Configuration of at least one nearby base station.

31. The method of claim 19, wherein the plurality of REM parameters comprise a Preamble initial receive target power (PIRTP) of at least one nearby base station.

32. The method of claim 19, wherein the at least one instruction is sent to the mobile circuitry using a universal asynchronous receiver-transmitter (UART) interface, a universal serial bus (USB) interface, or both.

33. The method of claim 19, wherein the plurality of REM parameters are determined for the frequency band while the cloud radio access network (C-RAN) is otherwise receiving radio frequency (RF) signals, transmitting RF signals, or both.

34. The method of claim 19, further comprising using the REM module to detect if at least one other antenna, coupled to a radio frequency (RF) module in the cloud radio access network (C-RAN), stops transmitting.

\* \* \* \* \*